3,054,837
AROMATIZATION PROCESS
Edward J. Janoski, Philadelphia, Pa., assignor to Sun Oil Company, Philadelphia, Pa., a corporation of New Jersey
No Drawing. Filed June 18, 1959, Ser. No. 821,113
8 Claims. (Cl. 260—673.5)

This invention relates to an aromatization process for converting nonaromatic hydrocarbons, including paraffins, cycloparaffins and olefins, into aromatic hydrocarbons by means of a novel catalyst composition.

In the past it has been known that molybdenum oxide supported on a support such as silica or alumina is an effective catalyst for promoting such reactions as aromatization of paraffinic hydrocarbons, reforming of gasoline-boiling range petroleum fractions, and isomerization reactions. Such molybdenum oxide catalysts are prepared by impregnating the support with a dissociable molybdenum compound in an amount sufficient to yield from about 5% to about 20% $MoO_3$ on the support after the impregnated support is calcined in the presence of oxygen. After calcination the catalyst is activated by heating in the presence of hydrogen at temperatures of from about 450° C. to about 550° C. for a period of from about 4 hours to about 10 hours to reduce the $MoO_3$ to a lower oxidation state. Reduction in this manner sometimes has an adverse effect on the structure of the support and the active component, since sintering may occur, with consequent reduction of the surface area.

I have now discovered that a superior molybdenum oxide catalyst which is particularly advantageous for effecting aromatization reactions can be prepared by reducing the $MoO_3$, distended on a support such as silica, alumina, titania and zirconia, by contact with an aluminum alkyl or aryl at room temperature or thereabouts in the absence of oxygen. High temperatures may be used, but do not give improved results over those obtained at room temperature. Aluminum compounds suitable for use in reducing the catalysts have the formula $AlR_2X$ in which R is a hydrocarbon radical, and X may be a hydrocarbon radical or hydrogen. Examples of such compounds include aluminum trimethyl, aluminum triethyl, aluminum triisobutyl, aluminum triphenyl, diethyl aluminum hydride, dimethyl aluminum hydride, and homologues thereof. A preferred method of conducting the reduction is to heat the supported $MoO_3$ catalyst under high vacuum at a temperature of from 200° C. to about 400° C. for a period of from 1 to 4 hours in order to evacuate oxygen and water from the pores of the catalyst. The catalyst is then cooled in vacuo to room temperature and is then contacted with one of the aluminum compounds referred to above dissolved in an inert hydrocarbon solvent in a mole ratio of molybdenum to aluminum compound of from about 9:1 to about 1:1. After allowing the catalyst to stand in contact with the aluminum compound for a period of time sufficient to convert the $MoO_3$ to a lower oxidation state, say from about 20 minutes to four hours, the solvent is displaced from the catalyst by an inert gas, and the catalyst is heated at a temperature of from about 250° C. to about 450° C. for a period of time sufficient to destroy any aluminum compound adhering thereto. The catalyst is then ready for use in the aromatization process of the present invention.

The aromatization process can be carried out with any nonaromatic hydrocarbon of the $C_6$–$C_9$ range, or mixture of such hydrocarbons, including aliphatic, cycloaliphatic and olefinic hydrocarbons. For example, a particularly suitable charge stock is a natural gasoline fraction containing $C_6$–$C_9$ hydrocarbons. The temperature for the aromatization reaction generally should be in the range of 475–575° C. and more preferably 500–550° C. The pressure generally can vary from 0.2 atmosphere to 100 p.s.i.g. Low pressures tend to aid the aromatization by promoting the necessary dehydrogenation reaction while high pressures tend to reduce coke formation by increasing the partial pressure of hydrogen in the reaction mixture. Suitable space rates, in terms of volumes of hydrocarbon charge (liquid basis) per volume of catalyst bed per hour, are in the range of 0.5–3.0. The hydrocarbon charge is heated to the desired temperature and the vaporized hydrocarbon is passed through a bed of the catalyst at the desired space rate and pressure, whereby dehydrogenation and cyclization reactions, and in some instances isomerization, occur to form aromatic hydrocarbons.

Coke formation occurs during the aromatization operation but at a rate which is substantially less than that obtained with the molybdenum oxide catalysts heretofore used. Whenever sufficient coke formation has occurred to reduce the activity of the catalyst substantially, the catalyst can be regenerated by burning off the coke in conventional manner. In doing so it is desirable to stop the regeneration before all of the coke has been removed from the catalyst in order to avoid oxidizing the molybdenum to a high state of oxidization. For example, the regeneration may be stopped when the coke content of the catalyst has been reduced to say 0.2% and the catalyst then can be re-used for promoting the aromatization operation.

After an extended time of use of the catalyst it may become desirable to subject it to another reducing treatment with an aluminum alkyl or aryl compound as defined hereinbefore so as to restore its activity. This can be done in situ preferably by first burning substantially all the coke from the catalyst, then reducing its temperature, for example, to within the range of 100–150° C., and thereafter passing hydrocarbon charge, to which an aluminum alkyl or aryl has been added, into the catalyst bed for a time. The aluminum compound is then omitted, and the temperature of the hydrocarbon charge is raised to within the range of 475–575° C. and the aromatization operation is resumed.

The following example is a specific illustration of the invention, showing the preparation of the catalyst, and the activity of the catalyst so prepared in the aromatization of n-heptane as compared with the activity of a molybdenum oxide catalyst activated by conventional hydrogen reduction.

*Example*

Catalyst A was prepared as follows: three volumes of an alumina-supported molybdenum oxide catalyst comprising 9% $MoO_3$ was thoroughly mixed with seven volumes of quartz and placed in a tube. The quartz was added to provide a heat fly-wheel to avoid local overheating in the subsequent heptane conversion, and possessed no catalytic activity of its own. The particle size of the solids ranged from 8 to 20 mesh. The tube was then evacuated to 1 mm. pressure absolute and was heated to 400° C. for three hours, after which it was cooled in vacuo to room temperature. The tube was then filled with n-heptane containing 7 grams of aluminum triisobutyl in solution, which was a mole ratio of $MoO_3$ to aluminum triisobutyl of 4.5 to 1. After a four hour contact time the liquid was displaced from the catalyst by dry nitrogen and the catalyst was heated to 400° C. in a stream of dry nitrogen for one hour in order to destroy any aluminum triisobutyl adhering to the catalyst.

Catalyst B was prepared by heating a duplicate sample of the supported molybdenum oxide catalyst and quartz in a hydrogen atmosphere for four hours at 450° C. Both catalysts were then used to catalyze the aromatization of a n-heptane feed at a temperature of 525° C. and at a liquid hourly space velocity (volume of n-heptane/volume of catalyst/hour) of 0.85. Product yields from these runs were as follows:

|  | Mole percent | | Vol. percent liquid recovery | Weight percent | |
|---|---|---|---|---|---|
|  | Aromatics | Olefins | | Gas | Coke |
| Catalyst A | 23.9 | 2.8 | 90.6 | 4.0 | 3.0 |
| Catalyst B | 19.0 | 2.9 | 89.9 | 3.0 | 3.5 |

As may be observed from the foregoing, activation of the catalyst by reduction with aluminum triisobutyl instead of hydrogen resulted in a catalyst which gave 25% more aromatics and 14% less coke, while the yield of olefins and total liquid recovery were virtually unaffected. Substantially similar results are obtained when other aluminum compounds, as herein defined, are employed in place of aluminum triisobutyl and when other non-aromatic hydrocarbons of the $C_6$–$C_9$ range are reacted in place of n-heptane.

This application is a continuation-in-part of my co-pending application Serial No. 715,175, filed February 14, 1958, which claims as a new composition of matter the catalyst employed in the present aromatization process.

I claim:

1. An aromatization method which comprises subjecting a $C_6$–$C_9$ nonaromatic hydrocarbon selected from the group consisting of paraffins, cycloparaffins and olefins to a temperature in the range of 475–575° C. in the presence of a catalyst consisting essentially of molybdenum oxide distended on a porous support, the molybdenum oxide comprising from about 5% to about 20% by weight, said catalyst having been prepared by contacting the molybdenum oxide-support composition with an aluminum compound having the formula $AlR_2X$ in which R is a hydrocarbon radical and X is selected from the group consisting of hydrogen and hydrocarbon radicals and heating the composition to a temperature sufficiently high and for a period sufficiently long to destroy any of said aluminum compound adhering to the composition.

2. Method according to claim 1 wherein said support is alumina.

3. Method according to claim 2 wherein said aluminum compound is aluminum triisobutyl.

4. An aromatization method which comprises subjecting a $C_6$–$C_9$ nonaromatic hydrocarbon selected from the group consisting of paraffins, cycloparaffins and olefins to a temperature in the range of 475–575° C. in the presence of a catalyst consisting essentially of molybdenum oxide distended on a porous support, the molybdenum oxide comprising from about 5% to about 20% by weight, said catalyst having been prepared by contacting the molybdenum oxide-support composition with an aluminum compound having the formula $AlR_2X$ in which R is a hydrocarbon radical having 1–6 carbon atoms and X is selected from the group consisting of hydrogen and hydrocarbon radicals having 1–6 carbon atoms and heating the composition to a temperature sufficiently high and for a period sufficiently long to destroy any of said aluminum compound adhering to the composition.

5. Method according to claim 4 wherein said support is alumina.

6. Method according to claim 5 wherein said aluminum compound is aluminum triisobutyl.

7. Method according to claim 5 wherein said $C_6$–$C_9$ non-aromatic hydrocarbon is heptane.

8. Method according to claim 1 wherein said $C_6$–$C_9$ non-aromatic hydrocarbon is heptane.

References Cited in the file of this patent

UNITED STATES PATENTS

| 2,290,845 | Voorhees | July 21, 1942 |
| 2,822,357 | Brebner | Feb. 4, 1958 |
| 2,824,089 | Peters et al. | Feb. 18, 1958 |
| 2,895,905 | Kimberlin | July 21, 1959 |
| 2,963,447 | Peters et al. | Dec. 6, 1960 |